United States Patent Office 3,493,083
Patented Feb. 3, 1970

3,493,083
WHEEL CHOCK MECHANISMS
Leslie Ernest Lightowler, Sheffield, England, assignor to Laycock Engineering Limited, Millhouses, Sheffield, England, a British company
Filed Dec. 27, 1967, Ser. No. 693,860
Claims priority, application Great Britain, Feb. 16, 1967, 7,562/67
Int. Cl. B60t *3/00;* F16h *21/44*
U.S. Cl. 188—32                         6 Claims

ABSTRACT OF THE DISCLOSURE

The invention provides a chock mechanism for use with chassis dynamometers, the mechanism including a pair of opposed chock members arranged to engage the wheel of a vehicle not cradled in the rolls of the dynamometer, one of the members having a movable pressure member arranged, upon the application of pressure, to cause a reactionary force to be applied to the wheel through the chock members.

---

Figure 1:
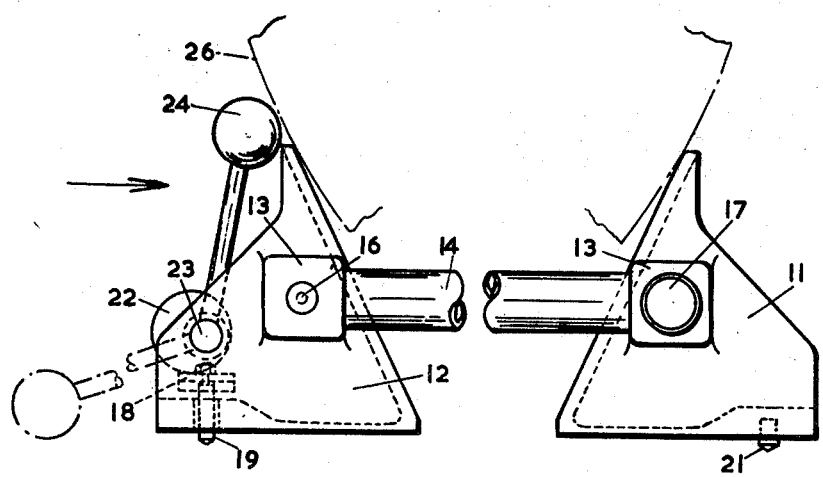

This invention relates to wheel chocks, particularly adapted for use in association with apparatus known as "chassis" dynamometers, i.e., apparatus in which the wheels of a road vehicle are credled in pairs of rollers for purposes of carrying out a variety of tests, e.g., brake horsepower tests on the engine of the vehicle, the rollers being driven by the driving wheels of the vehicle and being provided with power absorption means, e.g., disc brakes. The apparatus may also be used for the testing of the brakes of the vehicle, in which case the power absorption means are disconnected and the rollers (one of each pair) provided with driving means.

Whichever purpose the apparatus is being used for, it is necessary, in view of the tendency of the driving wheels of the vehicle to ride up the rollers, to provide chocks for the wheels of the vehicle which are not cradled in the rollers.

With the normal chock merely placed in position against the vehicle wheels, however, it has now been found that slight movement of the vehicle under the influence of the rollers or vehicle wheels, as the case may be, is possible, with the result that slippage may occur between the tyres of the wheels and the rollers, thus reducing the testing efficiency of the apparatus.

An object of the invention is to provide a wheel chock the use of which will alleviate or even obviate the difficulties referred to above.

According to the present invention, a wheel chock mechanism comprises a pair of chock body members secured together in spaced relationship with their inclined wheel-engaging portions opposed to each other, one of the body members being provided with a pressure member movable relatively to that body member towards and away from the base of that member and formed with one or more floor-contacting members, and means mounted on that body member for applying pressure to said pressure member so as to cause a reactionary force to be applied to the wheel through the wheel-engaging portions.

Conveniently, the pressure membr consists of a plate slidably mounted for up and down movement on the base of the body member by means of a pair of pins passing through suitable bores in the base for engagement with the floor, the tips of the pins preferably being conical to provide an initial bite upon the application of pressure. The base of the second body member is preferably provided with a pair of fixed spikes to provide a similar biting action.

The pressure applying means may consist of an eccentric or cam secured to a shaft rotatably mounted in the side walls of the body member and provided with a hand lever for rotating the shaft to cause the eccentric to apply pressure to the plate with a wedging action.

For convenience, the body members are mounted on a shaft engaging suitable bores in one side of the body members, one or both members being adjustably mounted on the shaft.

Figure 2:
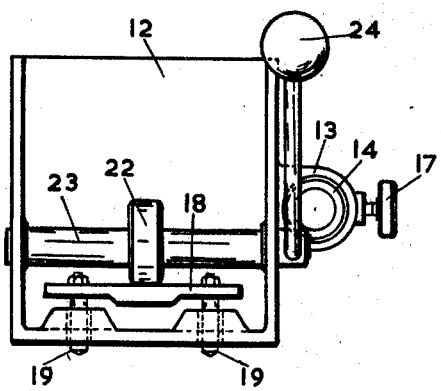

By way of example, the invention will now be described in greater detail with reference ot the accompanying drawings, in which:

FIGURE 1 is an elevation of a wheel chock mechanism according to the invention, and FIGURE 2 is an end view of the mechanism in the direction of the arrow in FIGURE 1.

A pair of chock body members 11 and 12 are formed, respectively, with lugs 13 bored for the reception of a tubular connecting shaft 14 arranged to be secured in one of the lugs 13 by a grub screw 16 and slidably mounted in the other lug 13, a knurled headed screw 17 serving to lock the shaft 14 in its adjusted position.

A pressure member in the form of a plate 18 is slidably mounted for up and down movement on the base of the body member 12 by means of a pair of pins 19 secured to the plate 18 and passing through suitable bores in the base for engagement with the floor, the tips of the pins 19 being conical to provide an initial bite upon the application of pressure. The base of the body member 11 is provided with a pair of fixed spike members 21 to provide a similar biting action.

The pressure-applying means in this example consists of an eccentric 22 secured to a shaft 23 rotatably mounted in the side walls of the body member 12 and provided with a hand lever 24 for rotating the shaft 23 to cause the eccentric 22 to apply pressure to the plate 18 with a wedging action.

In operation, the body members 11 and 12 are adjusted into firm contact with the tyre 26 of the vehicle wheel and locked in position on shaft 14 by the screw 17, with the hand lever 24 in the inoperative position, and the hand lever 24 is then pressed downwardly to rotate the eccentric 22 into wedging engagement with the pressure plate 18, thus at once causing the pins 19 and 21 to tend to bite into the floor and a reactionary force to be applied by the body members 11 and 12 to the tire 26 of the wheel.

It is found that the above mechanism is very successful in the avoidance of slip between the driving wheels of the vehicle and the dynamometer rolls.

I claim:

1. A wheel chock mechanism, comprising a pair of chock body members secured together in spaced relationship with their inclined wheel-engaging portions opposed to each other, one of the body members being provided with a pressure member slidably mounted for up and down movement on the base of the body member by means of a pair of pins passing through suitable apertures in the base for engagement with the floor, and means mounted on that body member for applying pressure to said pressure member so as to cause a reactionary force to be applied to the wheel through the wheel-engaging portions as a result of engagement between said floor-contacting members and the floor under the applied pressure.

2. Mechanism as in claim 1, wherein the tips of the pins are conical to provide an initial bite upon the application of pressure.

3. Mechanism as in claim 1, wherein the base of the second body member is provided with a pair of fixed spikes to provide a biting action.

4. A wheel chock mechanism, comprising a pair of chock body members secured together in spaced relationship with their inclined wheel-engaging portions opposed to each other, one of the body members being provided with a pressure member slidably mounted for up and down movement on the base of the body member by means of a pair of pins passing through suitable apertures in the base for engagement with the floor, said pins being provided with conical tips, means mounted on that body member for applying pressure to said pressure member so as to cause a reactionary force to be applied to the wheel engaging portions as a result of the engagement between said floor contacting members and the floor under the applied pressure, and the other body member being provided with a pair of fixed spikes to provide a biting action.

5. Mechanism as in claim 1, wherein the body members are mounted on a shaft engaging suitable bores in one side of the body members, one or both members being adjustably mounted on the shaft.

6. The mechanism as in claim 4, wherein the body members are mounted on a shaft engaging suitable bores in one side of the body members, one or both members being adjustably mounted on the shaft.

References Cited

UNITED STATES PATENTS

| 3,338,338 | 8/1967 | Lindeen | 188—32 |
| 2,496,499 | 2/1950 | Slavico | 188—32 |
| 2,961,070 | 11/1960 | Rickard | 188—32 |
| 3,326,329 | 6/1967 | Harrison | 74—107 X |

MILTON BUCHLER, Primary Examiner

THOMAS W. BUCKMAN, Assistant Examiner

U.S. Cl. X.R.

74—107